United States Patent [19]

Virgilio et al.

[11] 4,085,062
[45] Apr. 18, 1978

[54] N,N'-BIS-AROMATICFORMAMIDINES USEFUL AS SUNSCREENING AGENTS

[75] Inventors: Joseph A. Virgilio, Wayne; Milton Manowitz, Fair Lawn, both of N.J.

[73] Assignee: Givaudan Corporation, Clifton, N.J.

[21] Appl. No.: 744,856

[22] Filed: Nov. 24, 1976

[51] Int. Cl.² .................................................. F21V 9/06
[52] U.S. Cl. ........................ 252/300; 260/465 E; 260/518 R; 260/558 A; 260/562 R; 260/564 RF; 560/35
[58] Field of Search .................. 252/300; 96/84 UV; 260/471 R, 465 E, 564 RF, 518 R, 558 A, 562 R, 465.8

[56] References Cited

U.S. PATENT DOCUMENTS 2,687,962  8/1954  Chenicek ..................... 260/564 RF

OTHER PUBLICATIONS

Chemical Abstracts, vol. 63:10110e.
Chemical Abstracts, vol. 47:7500c.
Chemical Abstracts, vol. 50:13776h.
Chemical Abstracts, vol. 49:1718b.
Grammaticakis, P., "Remarques sur l'absorption ... de quelques diarylformamidines symetriques", Comptes Rendues Academie des Sciences, vol. 245, pp. 2307–2310, (1957).

*Primary Examiner*—Benjamin R. Padgett
*Assistant Examiner*—Deborah L. Kyle
*Attorney, Agent, or Firm*—Thomas Cifelli, Jr.; Robert F. Tavares

[57] ABSTRACT

U.V. absorbing compositions containing substituted N,N'-bis-aromaticformamidines and the use thereof as sun-screening agents.

28 Claims, No Drawings

N,N'-BIS-AROMATICFORMAMIDINES USEFUL AS SUNSCREENING AGENTS

BACKGROUND OF THE INVENTION

1. Field of the Invention

This invention is concerned with the protection of materials against the degradative effects of ultraviolet light.

2. The Prior Art

Certain organic materials which possess ultraviolet light absorbing properties can be added to many other organic materials to protect such substances from being degraded or damaged by ultraviolet light. For example, various polymers, plastics, resins, cosmetics, dyes, pigments, lacquers, varnishes, textiles, etc. are subject to photodegradation by sunlight or ultraviolet radiation and such materials are often protected by treatment with chemicals which will absorb the harmful rays and convert them to relatively harmless forms of energy.

An effective sunscreening agent must absorb large quantities of light in the ultraviolet portion of the suns rays which reach the earth, i.e. in the range of 290 to 400 nanometers. It should also, in addition to absorbing large quantities of ultraviolet light, be stable to U.V. radiation, be compatible with the medium into which it is incorporated, possess little or no color, be nontoxic, be thermally stable and have low volatility.

The prior art does not teach that substituted N,N'-bis-aromaticformamidines possess the outstanding light absorbing properties combined with high photo and thermal stability as disclosed in this invention.

SUMMARY OF THE INVENTION

This invention provides U.V. absorbing compositions comprising substituted N,N'-bis-aromaticformamidines and methods for their preparation. The compositions comprise the substituted N,N'-bis-aromaticformamidines of the general formula,

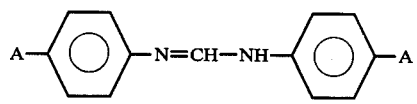

wherein A represents an acid, an ester, an amide, a nitrile or a phenyl ring. More specifically, A represents —COOR, —C≡N, —CONRR', —NRCOR' or phenyl. The nature of R and R' is not critical to this invention but is, in most cases, hydrogen or lower alkyl.

The U.V. screening agents of this invention are surprisingly very stable to photo and thermal degradation and are thereby valuable for a variety of applications.

They also absorb over a wide range of the U.V. spectrum (280-370 nm), their maximum absorption occurring between 310 and 340 nm.

In addition, the formamidines are colorless which makes them particularly valuable in retarding photodegradation in those cases where color could be a problem, such as in clear plastics etc.

More significant and surprising is their remarkable resistance to photodegradation and thermal degradation. The formamidines of this invention are from about 7 to 25 times more resistant to photodegradation than the commercially available 2-hydroxy-4-methoxybenzophenone. The compounds also show excellent thermal stability. All can be melted (ca 200° C) without decomposition.

DESCRIPTION OF THE PREFERRED EMBODIMENTS

Methods used for the preparation of the substituted N,N'-bis-aromaticformamidines are known in the art. Preferably, the substituted N,N'-bis-aromaticformamidines of the present invention are prepared by the reaction of essentially two molar amounts of the appropriate substituted aniline with a molar amount of an appropriate orthoformate. Such a condensation can be accomplished by heating alone, usually with concomitant removal of the alcohol formed, or via an acid catalyzed condensation which occurs at lower temperature. Alternatively, one can react one mole of the appropriate aniline with formic acid to form the formyl derivative (ArNCHO), which is subsequently condensed with a second mole of the appropriate aniline in the presence of a $PCl_5$, $SOCl_2$ or the like.

The N,N'-bis-aromaticformamidines of this invention, which are white crystalline solids, are isolated by crystallization from an appropriate solvent such as, for example, toluene, hexane, benzene, cyclohexane, etc. or blends thereof. If one chooses to run the reaction in an appropriate solvent, the product often crystallizes out of solution as formed.

The methods of preparation, which are not critical to this invention, are further illustrated in the examples provided herein.

The preferred compounds are those of the general formula,

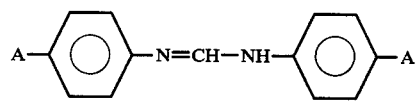

wherein the A group is an acid, an ester, an amide wherein the aromatic ring is bonded to the carbon, an amide wherein the aromatic ring is bonded to nitrogen, a nitrile or a phenyl ring.

When A is an ester group (—COOR) or an amide group

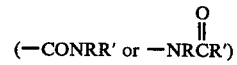

the nature of R and R' is not critical and will usually be dictated by other considerations such as cost and availability of starting materials. In most cases, the R and R' will be hydrogen or a simple aliphatic alkyl group. It should also be understood that in those cases where both R and R' exist they can either be the same, different, or part of the same cyclic system. One may also prepare a U.V. absorbing polymer where R or R' is a linking group, for example, a polyester of the form

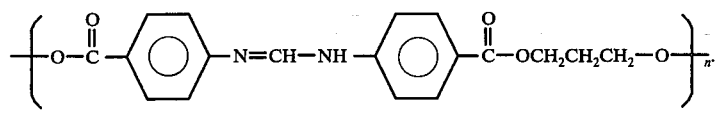

Such groupings could be incorporated into polymer chains or used as crosslinking groups in polymeric substances.

It is expected, based on practical considerations, that the groups R and R' will normally be in the range illustrated by Table I, i.e. the R of the ester group of from 1 to 8 carbon atoms and the R and/or R' of the amide group will normally be hydrogen or a lower alkyl of from one to four carbons.

The strong ultraviolet absorbing properties of the N,N'-bis-aromaticformamidines of this invention are demonstrated by dissolving the compounds in isopropanol and determining their spectrum using a recording ultraviolet spectrometer. Table I lists the wavelength of maximum absorption ($\lambda_{max}$) and the intensity of this absorption calculated as molar extinction coefficient ($\epsilon$).

Table I

| No. | A | Compound Name | $\lambda_{max}$ | $\epsilon$ |
| --- | --- | --- | --- | --- |
| 1 | —COOH | N,N'-bis(p-carboxyphenyl)formamidine | 323 | 31,700 |
| 2 | —COOMe | N,N'-bis(p-methoxycarbonylphenyl)formamidine | 326 | 42,100 |
| 3 | —COOEt | N,N'-bis(p-ethoxycarbonylphenyl)formamidine | 330 | 38,900 |
| 4 | —COO-n-Bu | N,N'-bis(p-n-butoxycarbonylphenyl)formamidine | 327 | 39,500 |
| 5 | —COO-n-octyl | N,N'-bis(p-n-octoxycarbonylphenyl)formamidine | 328 | 40,200 |
| 6 | —C≡N | N,N'-bis(p-cyanophenyl)formamidine | 322 | 35,400 |
| 7 | Phenyl | N,N'-bis(p-phenylphenyl)formamidine | 323 | 38,200 |
| 8 | —NHCOMe | N,N'-bis(p-acetamidophenyl)formamidine | 315 | 20,800 |
| 9 | —CONH$_2$ | N,N'-bis(p-carbamylphenyl)formamidine | 320 | 36,000 |
| 10 | —CONH-t-butyl | N,N'-bis(p-b-t-butylcarbamylphenyl)formamidine | 316 | 32,000 |
| 11 | —COONa | N,N'-bis(p-carboxyphenyl)formamidine,disodium salt | 324 | 32,000 |
| 12 | —CON(n-butyl)$_2$ | N,N'-bis(p-N-Di-n-butylcarbamylphenyl)formamidine | 311 | 23,000 |

Most of the compounds of Table I are white crystalline solids and do not add color to the material to be stabilized. Particularly significant is the high absorptivity and broad range over which the absorptivity is effective as shown by Table I.

Table I clearly reveals that the nature of the R and R' groups have little to do with the U.V. absorbing properties. The methyl, ethyl, butyl and octyl esters show little difference in U.V. absorbing properties. The same is true of the amides. Table I shows that U.V. absorbing properties differ very little depending upon whether the amide nitrogen is unsubstituted, monosubstituted or disubstituted.

The N,N'-bis-aromaticformamidines can be used to protect sensitive materials from the harmful effects of U.V. light. One can incorporate them into any U.V. sensitive material or into materials used to coat or protect U.V. sensitive materials.

For example, they may be mixed with organic materials, such as U.V. sensitive compounds, to absorb the U.V. before it has deleterious effects on the substance. They can be admixed with dyes or cosmetics to preserve the integrity of these materials. Incorporation into plastics prevents discoloration etc. which may occur in the absence of an effective U.V. absorber.

U.V. sensitive materials can be protected from the harmful rays by coating with a material containing the U.V. screening agent. The compositions of this invention can be incorporated into lotions to protect the skin from U.V. radiation, or incorporated into plastic containers or container coatings which will serve to protect the contents of such containers from the harmful effects of U.V. radiation.

The effective amounts of screening agent necessary for each application would be dependent on that application and determinable by those skilled in the art. For most applications a preferred range of 0.01 wt percent to 4 wt percent is effective, with 0.05 wt percent to 2 wt percent being especially preferred. However, in special formulations where higher concentrations are needed, amounts as high as 8% may be used. Such high amounts are often required in cosmetic formulations.

ILLUSTRATION OF THE PREFERRED EMBODIMENTS

A number of examples are provided herein to illustrate various aspects of this invention including examples illustrating methods of synthesis, stability and utility.

The examples provided herein are intended only to illustrate the preferred embodiments of this invention and should not be construed as limiting. They are intended to embrace any equivalents or obvious extensions which are known or should be known to a person skilled in the art.

EXAMPLE I

Synthesis of the N,N'-bis-(p-cyanophenyl)formamidine

A. p-Aminobenzonitrile (10.0 g, 0.085 mol) and triethylorthoformate (6.2 g, 0.042 mol) were heated at 150° until no more ethanol distilled into a Dean-Stark trap. The reaction mixture was cooled and triturated with ether (100 ml). Filtration yielded 6.0 g (57% theory) of the desired N,N'-bis-(p-cyanophenyl) formamidine, mp 220°–221.5°.

B. p-Aminobenzonitrile (23.6 g, 0.20 mol) and triethylorthoformate (14.8 g, 16.6 ml, 0.10 mol) were dissolved in 200 ml dry benzene. A trace (ca .01 g) of p-toluenesulfonic acid was added. The reaction mixture was allowed to sit overnight (16 hours) during which time the desired N,N'-bis-(p-cyanophenyl)formamidine precipitated. Filtration yielded 22.7 g (92% theory) of solid having a melting point of 214°–217° C. (mp after recrystallization, 220°–221.5).

All of the compounds listed in Table I were prepared by method A or B above. In a like manner, any appropriate p-substituted aniline can be reacted with ethyl orthoformate, or any other orthoformate, to provide the corresponding N,N'-bis-(p-substituted phenyl) formamidine.

EXAMPLE II

The photo stability of the compounds used in this invention was demonstrated in accelerated irradiation tests wherein a pyrex flask containing an isopropanol solution of the compound to be tested (ca 10 mg/liter) was exposed to a high intensity U.V. lamp. (Hanovoid Lamp 679A, 450 watts). Aliquots of these solutions were periodically examined spectrophotometrically to determine their rate of photodegradation.

The results shown in the table below demonstrate that the N,N'-bis-aromaticformamidines used in this invention are highly resistant to photodegradation. As the table shows, the commercial sunscreen 2-hydroxy-4-methoxybenzophenone is photodegraded 6–25 times faster than the highly stable N,N'-bis-aromaticformamidines.

| Compound[a] | A | Percent Degradation | | | | |
|---|---|---|---|---|---|---|
| | | 0 hrs. | 8 hrs. | 16 hrs. | 24 hrs. | 32 hrs. |
| 2 | —COOMe | 0 | 2 | 4 | 6 | 10 |
| 3 | —COOEt | 0 | 0 | 4 | 4 | 8 |
| 4 | —COO-nBu | 0 | 3 | 6 | 7 | 9 |
| 6 | —C≡N | 0 | 3 | 3 | 4 | 4 |
| 7 | —C$_6$H$_5$ | 0 | 6 | 6 | 13 | 15 |
| 8 | —NHCOMe | 0 | 2 | 2 | 2 | 5 |
| 2-Hydroxy-4-methoxy-benzophenone | | 0 | 2 | 55 | 80 | 100 |

[a]Corresponds to Table I number

EXAMPLE III

UV Exposure of Plastic Films Containing UV Absorbers

Plastic films containing compounds of Table I were prepared from a vinylchloride (87%) acetate (13%) resin mixture (VYHH) from Bakelite (Union Carbide) in the following manner: The resin (100 g) was placed in a flask and acetone was added until a total volume of 400 ml was achieved. After the resin had completely dissolved, a 10 ml aliquot of the resin solution was taken out and 0.01 g of a N,N'-bis-aromaticformamidine of Table I dissolved in a small portion of acetone was added. The mixture was stirred until uniform and poured into a Petri dish. The acetone was allowed to evaporate at room temperature. The film was then baked overnight at 55° and removed from the Petri dish. The casting thus formed contains 0.4% UV absorber (percent of finished film).

While the plastic films without the U.V. absorber transmitted U.V. light, those films containing an N,N'-bis-aromaticformamidine of Table I absorbed completely in the U.V. range from 280 mµ to 340 mµ.

Any of the N,N'-bis-aromaticformamidines of Table I can be used to prepare the U.V. absorbing plastic films.

EXAMPLE IV

This example illustrates the effectiveness of the compounds of this invention in protecting dyes from U.V. degradation.

To an isopropanol solution of F.D. and C. red No. 3 (H. Kohnstamm & Co.) was added 0.1% of N,N'-bis(p-ethoxycarbonylphenyl)formamidine. The solution was exposed to U.V. radiation (G.E. fluorescent lamp F 40 BL) and compared to a control sample (an isopropanol solution of the dye without U.V. absorber) similarly irradiated.

After fourteen days the red color had completely faded in the control sample while the stabilized sample was still red (less than half faded as determined spectrophotometrically). Even after 19 days the U.V. stabilized sample had a red color (ca. three-fourth's faded as determined spectrophotometrically).

Any of the compounds of Table I can be used in a similar manner.

We claim:

1. An ultraviolet absorbing composition comprising an effective ultraviolet absorbing amount of a compound of the formula

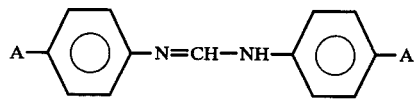

wherein:
A represents —COOR, —COOH, —CONR'R, —NR'COR, —C≡N or a phenyl group
wherein:
the R is an alkyl radical of from one to eight carbons and R' and R" group may be the same or different and are chosen from the group consisting of hydrogen and lower alkyl radicals of from one to four carbons;
and at least one organic material subject to degradation by ultraviolet light.

2. A composition of claim 1 wherein the effective amount is between 0.01 wt percent to 4.0 wt percent.

3. A composition of claim 2 wherein the effective amount is 0.05 wt percent to 2.0 wt percent.

4. A composition according to claim 1 wherein A is the group —COOR and R is an alkyl group of 1 to 8 carbons.

5. A composition according to claim 4 wherein the compound is

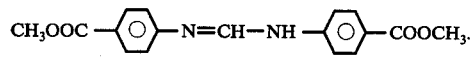

6. A composition according to claim 4 wherein the compound is

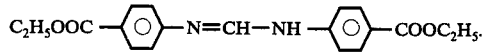

7. A composition according to claim 4 wherein the compound is

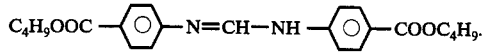

8. A composition according to claim 1 wherein the compound is

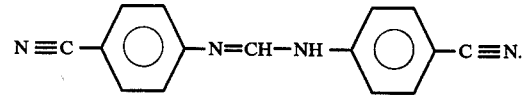

9. A composition according to claim 1 wherein the compound is

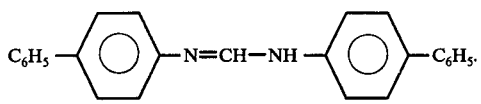

10. A composition according to claim 1 wherein the compound is

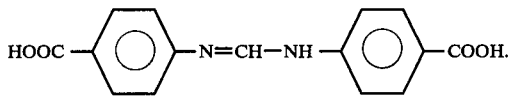

11. A composition according to claim 1 wherein A is the group —CONRR' and R' and R" are the same or different and are chosen from the group consisting of hydrogen and lower alkyl from one to four carbon atoms.

12. A composition according to claim 11 wherein the compound is

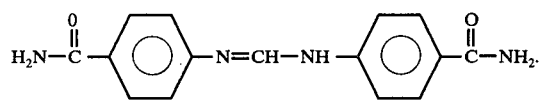

13. A composition according to claim 11 wherein the compound is

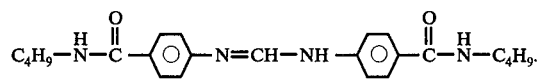

14. A composition according to claim 11 wherein the compound is

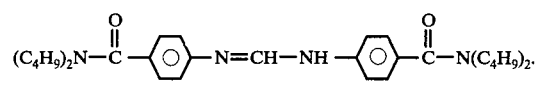

15. A composition according to claim 1 wherein A is the group NR'COR" and R' and R" are the same or different and are chosen from the group consisting of hydrogen and lower alkyl from one to four carbon atoms.

16. A composition according to claim 15 wherein the compound is

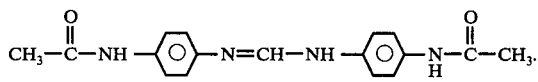

17. A method for preparing a light screening composition as set forth in claim 1 which comprises incorporating a compound of claim 1 into another organic material.

18. The method of claim 19 wherein the amount of compound incorporated is between 0.01 wt percent to 4.0 wt percent.

19. The method of claim 19 wherein the amount of compound incorporated is between 0.05 wt percent to 2.0 wt percent.

20. The method of claim 19 wherein the compound is incorporated into a transparent plastic.

21. The method of claim 19 wherein the compound is incorporated into a ultraviolet sensitive dye.

22. The method of claim 17 wherein A is the group —COOR and R is an alkyl group of 1 to 8 carbons.

23. The method of claim 19 wherein the compound is

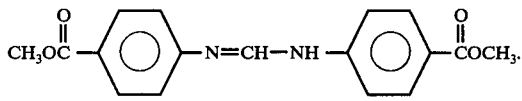

24. The method of claim 17 wherein the compound is

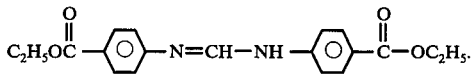

25. The method of claim 17 wherein the compound is

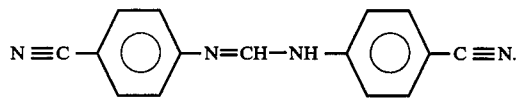

26. The method of claim 17 wherein the compound is

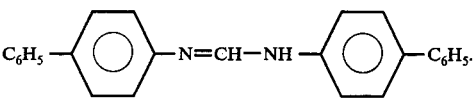

27. The method of claim 17 wherein A is CONR'R or NR'COR.

28. The method of claim 17 wherein the compound is

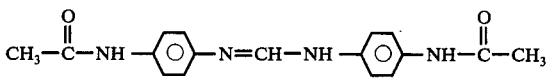

* * * * *